United States Patent [19]
Wada et al.

[11] Patent Number: 5,881,350
[45] Date of Patent: Mar. 9, 1999

[54] ORIGINAL GUIDING DEVICE

[75] Inventors: Hiroshi Wada; Mitsuharu Yoshimoto; Sinji Yamamoto; Tadahiro Kiyosumi; Junichi Inada; Takeshi Sakaguchi; Eijiro Masaki; Susumu Takehara, all of Osaka, Japan

[73] Assignee: Mita Industrial Co., Ltd., Osaka, Japan

[21] Appl. No.: 968,089

[22] Filed: Nov. 12, 1997

[30] Foreign Application Priority Data

Nov. 15, 1996 [JP] Japan .................................. 8-304641

[51] Int. Cl.[6] .................................................. G03G 21/00
[52] U.S. Cl. ...................... 399/367; 271/3.14; 399/365
[58] Field of Search ..................... 399/365, 367, 399/361; 271/3.01, 3.05, 3.08, 3.14, 4.01, 10.01

[56] References Cited

U.S. PATENT DOCUMENTS

| 4,465,272 | 8/1984 | Kajita et al. ............................ 271/245 |
|---|---|---|
| 4,761,001 | 8/1988 | Hayakawa et al. .................... 271/3.01 |
| 4,975,749 | 12/1990 | Tsunoda et al. ..................... 271/902 X |
| 5,090,682 | 2/1992 | Takimoto ............................ 271/3.14 X |
| 5,341,203 | 8/1994 | Tokutsu ............................... 271/3.08 X |
| 5,599,010 | 2/1997 | Hull et al. .............................. 271/3.05 |

*Primary Examiner*—Richard Moses
*Attorney, Agent, or Firm*—Beveridge, DeGrandi, Weilacher & Young, LLP

[57] ABSTRACT

An original guiding device capable of improving the conveyance of an original in an original conveying path. There is provided an original carrying-in path formed so as to be inclined from the original conveying path and a guiding mechanism for guiding the original while restraining the deformation of the original between the original carrying-in path and the original conveying path. The guiding mechanism may be one for guiding the original while elastically holding the original therein.

8 Claims, 4 Drawing Sheets

ORIGINAL GUIDING DEVICE

BACKGROUND OF THE INVENTION

1. Field of the Invention

The present invention relates to an original guiding device having an original conveying path formed along the upper surface of a transparent platen and a reading optical system fixed below the transparent platen, and adaptable to an image reading device for reading an original by the reading optical system while conveying the original through the original conveying path.

2. Description of Related Art

In a digital copying machine, a facsimile, or an image reader, for example, an image reading device for reading an image of an original moved along the upper surface of a transparent platen by an optical system fixed below the transparent platen may, in some cases, be used. An arrangement of an original conveying device used for such an image reading device in the vicinity of the transparent platen is shown in FIGS. 6 and 7.

An original holding member 28 is provided in a state where a clearance defining an original conveying path 29 is ensured above a transparent platen 21. An original P to be read is fed to the original conveying path 29 through an original carrying-in path 27 curved in an approximately C shape, as viewed from the front, from an original tray (not shown) arranged diagonally to the upper right in the drawing of the transparent platen 21. That is, the original P is fed to the original conveying path 29 diagonally from above. A trailing edge 27a of the original carrying-in path 27 is positioned above the surface of the transparent platen 21 to form a step so as not to prevent the leading end of the original P from advancing.

On the other hand, a discharge tray for containing an original after reading is provided below the original tray. In order to discharge the original after reading processing into the discharge tray, a guiding member 30 for guiding the original P toward the discharge tray from the original conveying path 29 and an original guide (not shown) connecting with the guiding member 30 form an original carrying-out path 31. The surface of the guiding member 30 is made lower than the transparent platen 21 in a portion connecting with the transparent platen 21 to form with a step so as not to prevent the leading end of the original P from advancing.

FIG. 6 shows the moment of contact of the leading end of the original P with the surface of the guiding member 30. When the leading end of the original P horizontally conveyed along the original conveying path 29 is brought into contact with an inclined surface of the guiding member 30, it instantaneously receives a reaction in a direction opposite to the direction of the advance. Since the original P is pushed forward by a conveying roller (not shown) at the rear portion thereof, the original P instantaneously deflects as indicated by a two-dot and dash line in FIG. 6. During this time, image reading processing is also performed on the transparent platen 21, whereby a read image may be distorted by the deflection.

On the other hand, FIG. 7 shows the moment of passage of the trailing end of the original P through the trailing edge 27a of the original carrying-in path 27. When the trailing end of the original P passes through the trailing edge 27a of the original carrying-in path 27, the trailing end of the original P is instantaneously moved to a position indicated by a two-dot and dash line upon moving apart from the trailing edge 27a of the original carrying-in path 27. Therefore, the effect of the reaction also extends to a portion where reading processing is being currently performed, so that a read image is distorted.

That is, in the case of the image reading device, image reading processing is performed during original conveyance, whereby the read image is distorted by a subtle change in posture of the original with a slight shock received by the original during original conveyance.

SUMMARY OF THE INVENTION

An object of the present invention is to provide an original guiding device capable of satisfactorily conveying an original without depending on a shock received by the original.

Another object of the present invention is to provide an original guiding device in which an image read while an original is being conveyed is not distorted without depending on a shock received by the original.

Still another object of the present invention is to provide an original guiding device capable of satisfactorily conveying an original without depending on a shock received by the original.

A further object of the present invention is to provide an original conveying device in which an image read while an original is being conveyed is not distorted without depending on a shock received by the original.

A still further object of the present invention is to provide an original reading device capable of satisfactorily reading an original without depending on a shock to the original conveyed by an original conveying device.

An original guiding device according to the present invention comprises an original conveying path, an original carrying-in path, through which an original fed toward the original conveying path passes, formed so as to be inclined from the original conveying path, and a guiding mechanism for guiding the original while restraining the deformation of the original between the original carrying-in path and the original conveying path.

Consequently, the original is not deformed, and the posture thereof is not changed in the vicinity of the original conveying path. Even if the original receives a shock while the original is being conveyed, therefore, the original can be satisfactorily conveyed in the original conveying path.

When the original conveying path is opposite to a reading section of an image reading device, an image read by the image reading device is not distorted.

The guiding mechanism may include a pair of plate-shaped members arranged opposite to each other so as to hold the original which is being conveyed therebetween. In this case, at least one of the pair of plate-shaped members may be an elastic plate, to restrain the deformation of the original by elastically holding the original therebetween.

It is preferable that the pair of plate-shaped members forms a smooth original path directed from the original carrying-in path to the original conveying path.

Furthermore, the guiding mechanism may be a pair of brushes for elastically holding the original therebetween between the original carrying-in path and the original conveying path.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
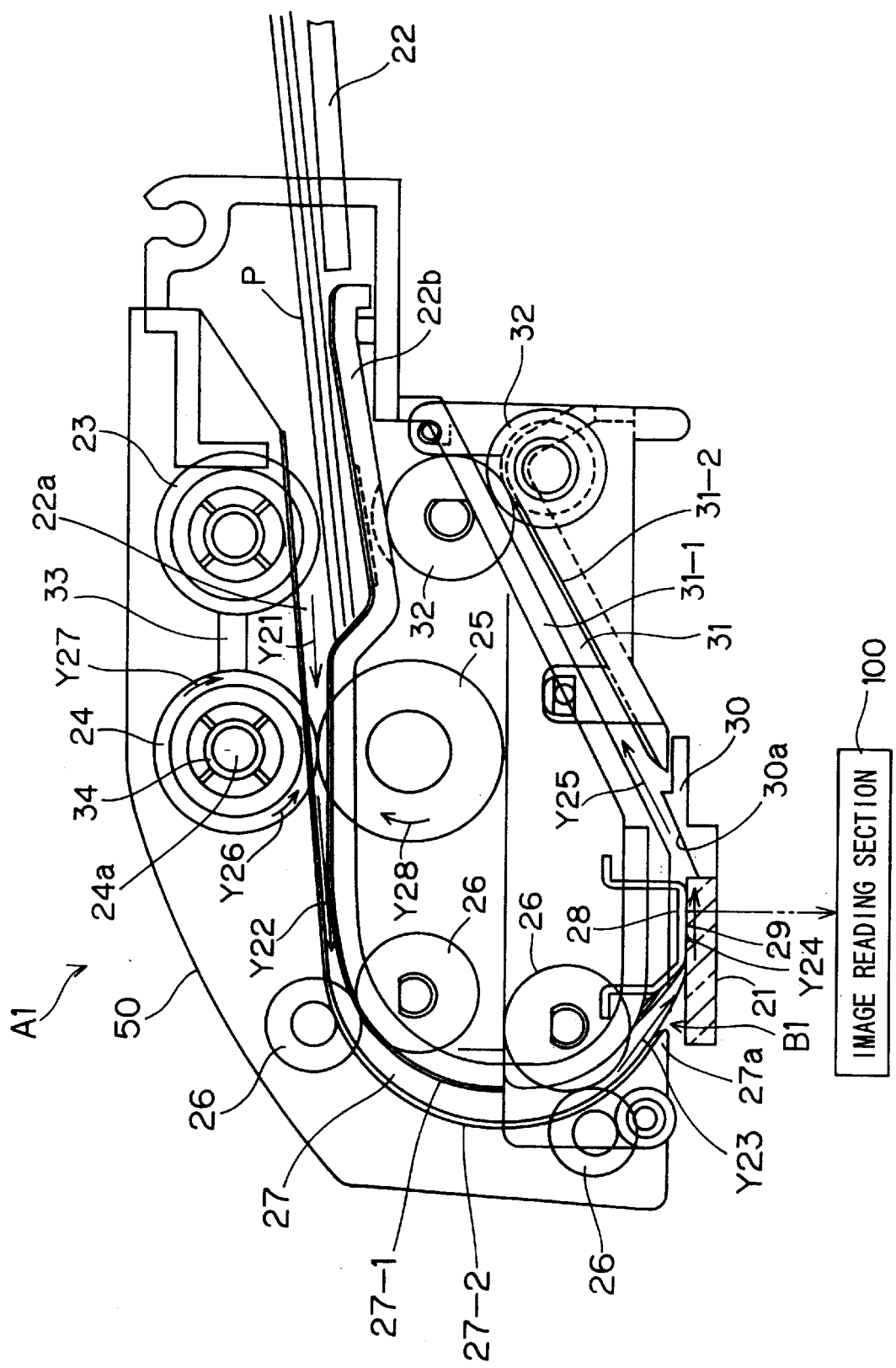
FIG. 1 is a simplified cross-sectional view showing the construction of an original conveying device according to one embodiment of the present invention.

FIG. 1 is a simplified cross-sectional view showing the construction of an original conveying device A1 according to one embodiment of the present invention. An original conveying device A1 is carried on a transparent platen 21 located on the upper surface of an image reading section 100 of a digital copying machine. The image reading section 100 has a reading optical system fixed below the transparent platen 21.

An original tray 22 is provided on the right side of the main body 50 of the original conveying device, as viewed from the front of the copying machine. An original supporting tray 22b for supporting the leading end (the left end in FIG. 1) of an original P put on the original tray 22 is provided in the main body 50. A forward feeding roller 23 movably up and down is arranged above the original supporting tray 22b.

An original carrying-in path 27 leading to the vicinity of a left end of the transparent platen 21 from the original supporting tray 22b is so formed as to be curved in a C shape, as viewed from the front, in the main body 50. The original carrying-in path 27 is constituted by original guides 27-1 and 27-2. Two pairs of conveying rollers 26 are located with a space provided therebetween on the original carrying-in path 27.

A paper feeding port 22a which is the inlet of the original carrying-in path 27 is formed in the vicinity of a leading edge (in the vicinity of a left end in FIG. 1) of the original supporting tray 22b. A feeding roller 24 and a separating roller 25 are located in the vicinity of the paper feeding port 22a, which are in contact with each other.

The forward feeding roller 23 and the feeding roller 24 are synchronized in rotation in the same direction by synchronizing means (not shown). Further, the forward feeding roller 23 and the feeding roller 24 are connected to each other by a lever 33, and the lever 33 is mounted rotatably around a rotation center 24a of the feeding roller 24. Further, a one-way clutch 34 connected to the lever 33 only when the feeding roller 24 is rotated in a direction indicated by an arrow Y26 is provided in relation to the feeding roller 24. When the feeding roller 24 is rotated in the direction indicated by the arrow Y26, therefore, the one-way clutch 34 is connected, and the lever 33 is also rotated in the direction indicated by the arrow Y26 around the rotation center 24a, whereby the forward feeding roller 23 is raised. When the feeding roller 24 is rotated in a direction indicated by an arrow Y27, the forward feeding roller 23 is lowered by its own weight.

Above the transparent platen 21, an original holding member 28 is located opposite to the upper surface of the transparent platen 21. The original holding member 28 is elastically urged downward while holding a slight clearance (an original conveying path 29) between the original holding member 28 and the upper surface of the transparent platen 21.

A guiding member 30 having a guiding slope 30a for guiding the original diagonally upward is provided on the downstream side in the direction of original conveyance (rightward in FIG. 1) of the transparent platen 21. Further, an original carrying-out path 31 interposed between original guides 31-1 and 31-2 is disposed in connection with the guiding member 30, and a pair of discharge rollers 32 is arranged on the original carrying-out path 31.

A leading edge on the side of the transparent platen 21 of the guiding slope 30a of the guiding member 30 is in a position lower than the transparent platen 21. Consequently, a step is formed so as not to prevent the leading end of the original P from advancing.

Figure 2:
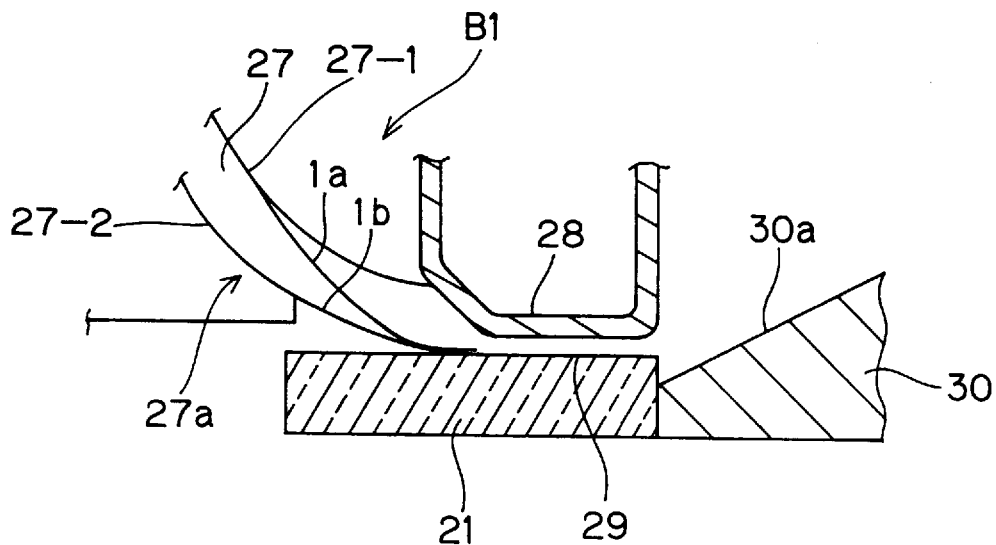
FIG. 2 is a cross-sectional view showing the schematic construction of an original guiding mechanism.

FIG. 2 is a cross-sectional view showing an arrangement in the vicinity of the transparent platen 21 in an enlarged manner. An original guiding mechanism B1 is provided in the outlet of the original carrying-in path 27 for feeding the original P to the transparent platen 21 diagonally from above. The original guiding mechanism B1 includes a pair of upper and lower plate-shaped elastic members 1a and 1b (a PET film, for example) connected to an end on the downstream side in the direction of original conveyance of the original carrying-in path 27. The plate-shaped elastic members 1a and 1b are continuously connected to upper and lower surfaces of the outlet of the original carrying-in path 27 without steps, respectively. Leading edges of the plate-shaped elastic members 1a and 1b are brought into contact with each other, to reach the upper surface of the transparent platen 21. Consequently, the pair of plate-shaped elastic members 1a and 1b connects the original carrying-in path 27 and the original conveying path 29 by a smooth track.

The plate-shaped elastic member 1b positioned on the lower side is connected to a leading edge of the original guide 27-2 positioned on the lower side in the outlet of the original carrying-in path 27. The plate-shaped elastic member 1b extends diagonally downward, and the leading edge thereof is brought into contact with the upper surface of the transparent platen 21 in the vicinity of the inlet of the original conveying path 29.

The plate-shaped elastic member 1a positioned on the upper side is connected to the vicinity of a leading edge of the original guide 27-1 positioned on the upper side in the outlet of the original carrying-in path 27. The plate-shaped elastic member 1a extends diagonally downward, to gradually approach the plate-shaped elastic member 1b positioned on the lower side, and the leading edge thereof is brought into contact with the leading edge of the plate-shaped elastic member 1b in the vicinity of the inlet of the original conveying path 29.

Description is made of an original conveying operation of the original conveying device A1 of such construction.

First, the original P is set on the original supporting tray 22 so that its leading end is supported by the original supporting tray 22b and is abutted against the paper feeding port 22a. At this time, the lever 33 is in its position slightly rotated in a counterclockwise direction from the state shown in FIG. 1, whereby the forward feeding roller 23 stands still in its raised position above the set original P. Specifically, the forward feeding roller 23 does not prevent the original P from being set.

When the leading end of the original P is set on the original supporting tray 22b, the feeding roller 24 is rotated in the direction indicated by the arrow Y27, and the forward feeding roller 23 is also rotated in the same direction in synchronism with the rotation. Consequently, the forward feeding roller 23 is lowered by its own weight, and is brought into contact with the original P while being rotated. Therefore, the uppermost original P is fed in a direction indicated by an arrow Y21. In the case, the lower originals are moved in the direction indicated by the arrow Y21 upon being dragged by the uppermost original due to the friction between the originals. However, the originals other than the uppermost original are pushed back by the rotation of the separating roller 25 in a direction indicated by an arrow Y28, and only the uppermost original is drawn in a direction indicated by an arrow Y22 by the rotation of the feeding roller 24 in the direction indicated by the arrow Y27.

The original P drawn by the feeding roller 24 is conveyed by the two pairs of conveying rollers 26 located in the original carrying-in path 27, and is moved in a direction indicated by an arrow Y23. Thereafter, the original P enters and moves through the original conveying path 29 formed in a clearance between the transparent platen 21 and the original holding member 28 in a direction indicated by an arrow Y24. During this time, that is, while the original P is moved in the original conveying path 29, an image on the original P is read by the reading optical system fixed below the transparent platen 21.

The original P passing through the original conveying path 29 advances in a direction indicated by an arrow Y25 in the original carrying-out path 31 upon being guided by the guiding member 30, and is discharged onto a discharge tray (not shown) by the discharge roller 32.

Figure 3:
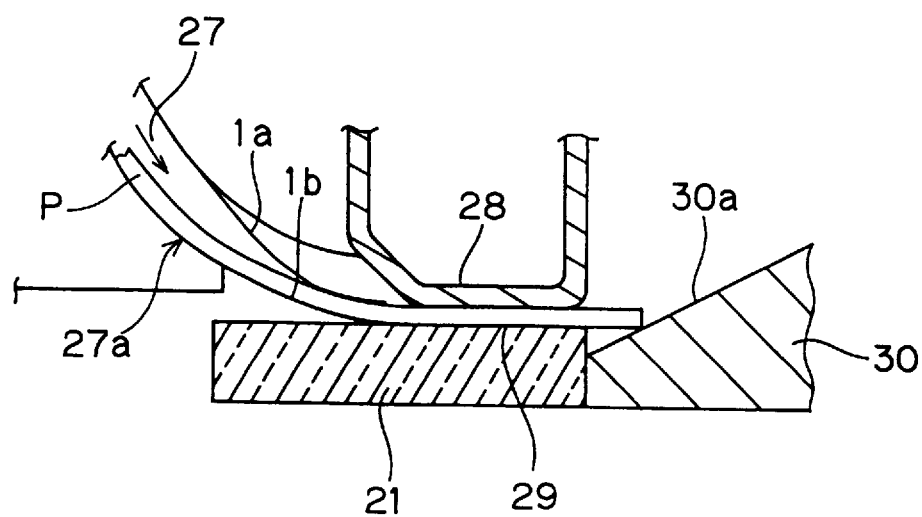
FIG. 3 is an explanatory view showing one example of a state where an original is conveyed through the original guiding mechanism.
Figure 4:
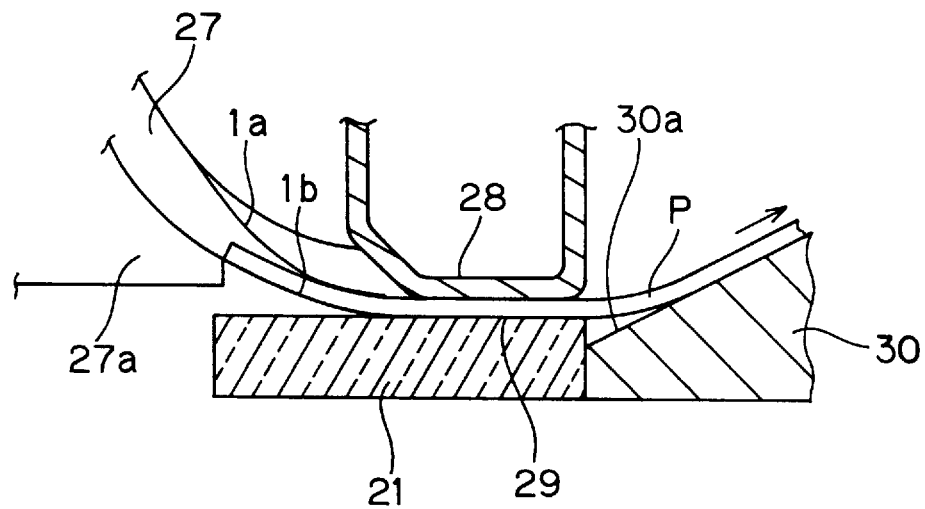
FIG. 4 is an explanatory view showing one example of a state where an original is conveyed through the original guiding mechanism.

FIGS. 3 and 4 show a state where the original P is conveyed through the original guiding mechanism B1, where FIG. 3 shows the moment of contact of the leading end of the original P with the surface of the guiding member 30, and FIG. 4 shows the moment of passage of the trailing end of the original P through the trailing edge 27a of the original carrying-in path 27.

Figure 6:
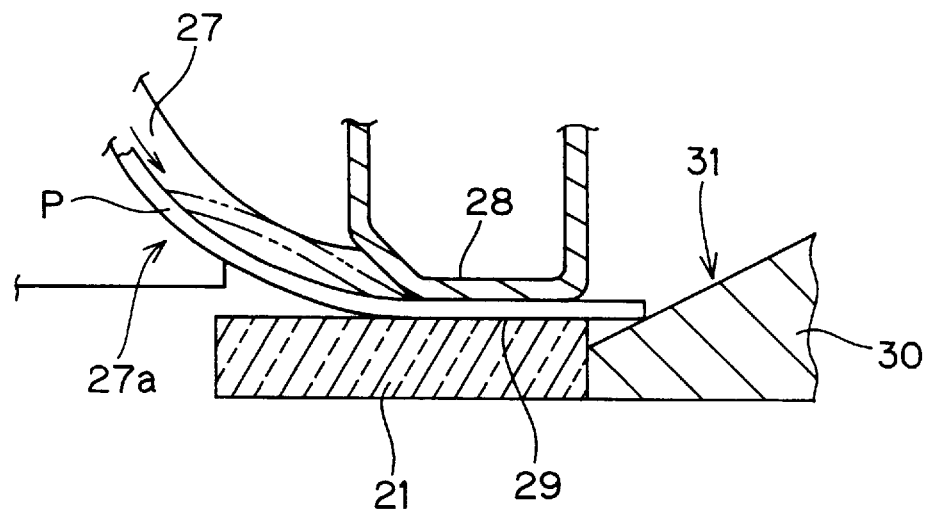
FIG. 6 is a partially enlarged view showing one example of a state where an original is conveyed in a conventional device.

As shown in FIG. 3, the original P is conveyed into the original conveying path 29 with the original P elastically held between the upper and lower plate-shaped elastic members 1a and 1b. The moment the leading end of the original P is brought into contact with the surface of the guiding member 30, the leading end of the original P instantaneously receives a reaction in a direction opposite to the direction of the advance. However, in a connecting portion between the original carrying-in path 27 and the original conveying path 29, the original is elastically held by the upper and lower plate-shaped elastic members 1a and 1b, and is guided on a predetermined smooth track. Therefore, the original P does not deflect as shown in FIG. 6, so that a read image is not distorted.

Figure 7:
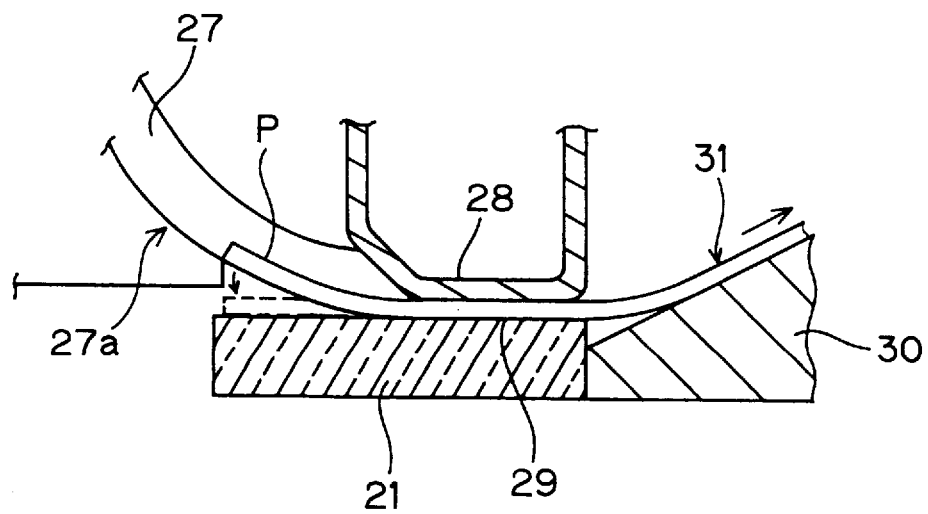
FIG. 7 is a partially enlarged view showing one example of a state where an original is conveyed in the conventional device.

Furthermore, as shown in FIG. 4, when the trailing end of the original P passes through the trailing edge 27a of the original carrying-in path 27, the trailing end of the original P is elastically supported by the lower plate-shaped elastic member 1b, and is guided on a predetermined smooth track. Therefore, the instantaneous movement of the trailing end of the original P as shown in FIG. 7 is not made. Also in this case, a read image is not distorted.

The original guiding mechanism B1 is thus constructed by comprising the pair of upper and lower plate-shaped elastic members 1a and 1b connected to the downstream side of the original carrying-in path 27. The original P is elastically held by the upper and lower plate-shaped elastic members 1a and 1b in the connecting portion between the original carrying-in path 27 and the original conveying path 29, and is guided on a predetermined smooth track. Consequently, the original P is conveyed to the original conveying path 29 from the original carrying-in path 27 without being changed in posture. Consequently, the read image is not distorted by a shock received by the original during original conveyance.

In the present embodiment, steps formed in a connecting portion between the trailing edge 27a of the original carrying-in path 27 and the upper surface of the transparent platen 21 and a connecting portion between an end on the downstream side of the upper surface of the transparent platen 21 and the guiding member 30 are taken as an example as the cause of a shock received by the original during original conveyance. However, various causes other than the steps are considered as the cause of the shock received by the original. In any case, even if the original receives a shock, the original can be satisfactorily read by the function of the original guiding mechanism B1.

Furthermore, the original guiding mechanism according to the present invention is applicable to original conveying devices of various constructions without being limited to the original conveying device of the construction shown in FIG. 1.

Figure 5:
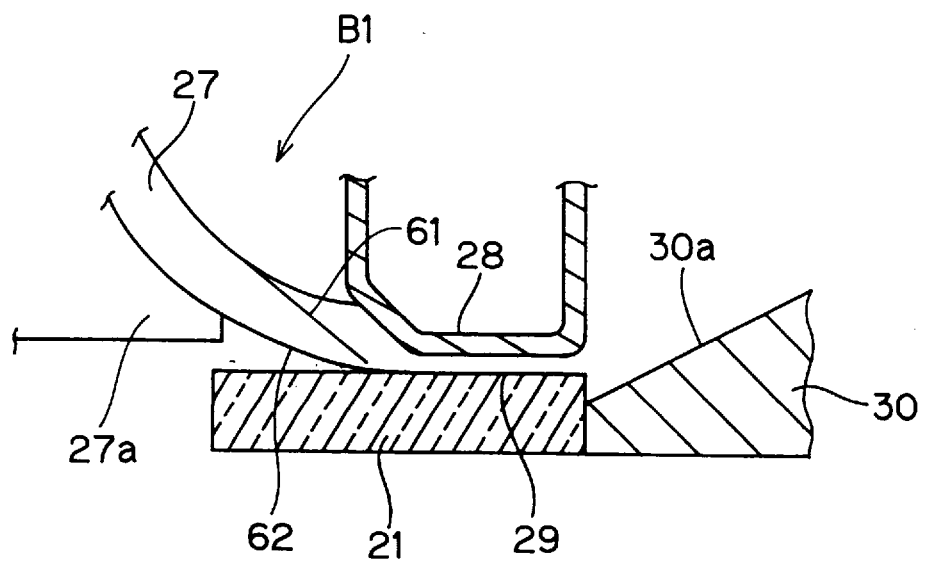
FIG. 5 is a simplified cross-sectional view showing the construction of an original guiding mechanism according to another embodiment of the present invention.

Additionally, although in the above-mentioned embodiment, a pair of upper and lower plate-shaped elastic members such as a PET film is used as a guiding mechanism, a pair of upper and lower brushes may be used in place of the plate-shaped elastic members, in which case the same effect can be expected. In this case, brushes 61 and 62 may be respectively mounted on the leading edges of the original guides 27-1 and 27-2 in the outlet of the original carrying-in path 27 with their bristles having elasticity directed toward the transparent platen 21, as shown in FIG. 5.

Although the embodiments of preferred present invention have been described and illustrated in detail, it is clearly understood that the same is by way of illustration and example only and is not to be taken by way of limitation, the spirit and scope of the present invention being limited only by the terms of the appended claims.

This application claims priority benefits under 35 USC §119 of Japanese Patent Application Serial No. 8-304641 filed in the Japanese Patent Office on Nov. 15, 1996, the disclosure of which is incorporated herein by reference.

What is claimed is:

1. An original guiding device comprising:
   an original conveying path;
   an original carrying-in path, through which an original fed toward the original conveying path passes, formed so as to be inclined with respect to the original conveying path; and
   a guiding mechanism for guiding an original while restraining a deformation of the original between the original carrying-in path and the original conveying path,
   the guiding mechanism including a pair of plate-shaped members arranged opposite to each other so as to hold an original which is being conveyed therebetween.

2. An original guiding device according to claim 1, wherein
   at least one of the pair of plate-shaped members is an elastic plate, to restrain the deformation of an original by elastically holding the original therebetween.

3. An original guiding device according to claim 1, wherein the pair of plate-shaped members forms a smooth original path directed from the original carrying-in path to the original conveying path.

4. An original guiding device according to claim 1, wherein at least one of the pair of plate-shaped members is connected to the original carrying-in path.

5. An original guiding device according to claim 1, wherein the original conveying path is opposite to a reading section of an image reading device.

6. An original guiding device comprising:

an original conveying path;

an original carrying-in path, through which an original fed toward the original conveying path passes, formed so as to be inclined with respect to the original conveying path; and a guiding mechanism for guiding an original while restraining a deformation of the original between the original carrying-in path and the original conveying path, the guiding mechanism restraining the deflection of an original between the original conveying path and the original carrying-in path when a force in a direction opposite to the direction of original conveyance is applied to the leading end of the original.

7. An original guiding device comprising:

an original conveying path;

an original carrying-in path, through which an original fed toward the original conveying path passes, formed so as to be inclined with respect to the original conveying path; and a guiding mechanism for guiding an original while restraining a deformation of the original between the original carrying-in path and the original conveying path, the guiding mechanism restraining the deformation at a trailing end of an original at the moment of completion of passage of the trailing end of the original through the original carrying-in path.

8. An original guiding device comprising:

an original conveying path;

an original carrying-in path, through which an original fed toward the original conveying path passes, formed so as to be inclined with respect to the original conveying path; and a guiding mechanism for guiding an original while restraining a deformation of the original between the original carrying-in path and the original conveying path, the guiding mechanism having a pair of brushes for elastically holding an original therebetween between the original carrying-in path and the original conveying path.

* * * * *